Patented Oct. 26, 1943

2,333,050

UNITED STATES PATENT OFFICE 2,333,050

SEPARATING HEMATOXYLIN FROM LOGWOOD EXTRACT

Roy W. Shunkwiler, Philadelphia, Pa., assignor to Hartman-Leddon Company, Philadelphia, Pa., a corporation of Delaware No Drawing. Application August 15, 1942, Serial No. 455,012

3 Claims. (Cl. 260—333)

The present invention relates to a simple and economical method for the treatment of plant extracts to obtain the active ingredient therefrom, and more particularly it relates to a process by which the crystallizable material of plant extracts may be separated from the other components thereof.

Plant extracts find many uses in the industrial fields, and the efficiency of such extracts for a particular purpose is usually dependent on one or more crystallizable substances which are present in the extract with colloidal materials, such as resins or the like. The presence of these colloids inhibits the crystallization of the crystallizable material, and heretofore the use of a tedious and expensive process has been required in the separation of the crystallizable material from the other components of the extract. For this reason, the plant extracts themselves have generally been used industrially, and the relatively pure crystalline material is usually only used in scientific, medicinal and like fields. The use of the extract has certain well-recognized disadvantages; for example, in some instances it is difficult to adopt a standardized process in the industrial plant because of changes in composition of the extracts from time to time. A further disadvantage in the use of the extract resides in the fact that it usually contains a relatively large proportion of inactive ingredients, and may even contain ingredients which are deleterious in the particular use of the extract.

As a typical illustration, reference will be made to logwood extract. This extract is widely used as a dye in the textile, leather, fur and other fields. The extract contains hematoxylin, which is the active component responsible for the value of logwood as a dye. Hematoxylin is a glucoside which in its anhydrous form has the formula $C_{16}H_{14}O_6$. When crystallized from aqueous solutions, it usually occurs as fine needle-like crystals of a light brown or straw color, generally including three molecules of water in its structure which may be removed by oven-drying at 105° C.–110° C. Hematoxylin is readily converted upon exposure to air or by the usual chemical processes of oxidation to hematein ($C_{16}H_{12}O_6$), and this oxidation of the hematoxylin is relied upon in dyeing processes.

The procedures hitherto available for separating hematoxylin from the other components of logwood extract have been so involved in character and costly in operation that hematoxylin has not been generally used commercially, logwood dyeing being limited to the use of the aqueous extracts. The relatively pure hematoxylin manufactured by these processes has been usually employed only as a stain in histology and the like. In accordance with one process which has been used for many years, Jour. Ind. Eng. Chem., vol. 12, No. 2, p. 173, Feb. 1920), the dried aqueous extract of logwood, as produced for commercial dyeing, is extracted with an organic selective solvent, such as ether. The organic solvent solution containing the hematoxylin is separated from the other components, the solvent is evaporated, and the hematoxylin is re-crystallized from an aqueous solution to provide a nearly pure substance.

Many solvent extractions of plant materials, such as the described process for the separation of hematoxylin from logwood extract, are performed in the chemical and drug fields by means of tall glass or metal percolators, the solvent being allowed to remain in contact with the plant substance for varying periods of time and economical yields being attained only generally after long periods of extraction with numerous wash treatments of the substance undergoing extraction. These procedures are not only time-consuming and wasteful of labor, but are also accompanied by exposure of the operators to possible fire and explosion hazards, as well as to deleterious and undesirable effects physiologically from undue exposure to solvent fumes. Continuous extraction devices for avoidance of fume exposure, for greater economy in operation and for improved safety factors have also been devised and described in the literature (Jour. Ind. Eng. Chem., vol. 17, No. 8, p. 830, Aug. 1925).

The principal object of the present invention is to provide a process by which crystallizable material may be easily and economically separated from the other components of plant extracts, for example, the separation of hematoxylin from logwood extract.

A further object of the present invention is to provide a process for the treatment of plant extracts in which the non-crystallizable substances are held in solution by the use of a common inexpensive chemical, while the crystallizable material is permitted to crystallize freely as a relatively pure product.

Still another object of the present invention is to provide a non-hazardous process in which the separation of the crystallizable material from plant extracts is accomplished in simple, inexpensive and non-specialized equipment, and by which relatively large yields of a relatively pure crystalline material is obtained within a few hours, as contrasted to the prior processes, where days were required to obtain comparable yields.

Other objects will be apparent from a consideration of this specification and the claims.

While, as above stated, the process of the present invention is applicable for the treatment of the various plant extracts to separate the crystallizable material therefrom, the invention, for illustrative purposes, will be described in connection with the treatment of logwood extract to separate hematoxylin therefrom. The process of the present invention is antithetical to the previous methods available where a solvent having selectivity for the hematoxylin has been employed, and the hematoxylin is removed in solution, while the colloidal or non-crystallizable material remains undissolved. In accordance with the present invention, the colloidal or non-crystallizable substances are dissolved; while the hematoxylin in relatively pure form crystallizes freely in the solution and is separated therefrom.

In the process of the present invention, a plant extract, such as logwood extract, of any desired grade and physical form, is dissolved in an aqueous solution of urea, the crystallizable material (hematoxylin in the case of logwood extract) is crystallized in the solution and the crystals are separaed from the solution. In the preferred embodiment, an aqueous extract of logwood, either in dry or paste form is dissolved in an aqueous solution of urea, of a concentration in which the hematoxylin will crystallize therein. The mixture of extract and urea solution is allowed to stand and the hematoxylin crystallizes in the solution in the form of fine needle-like crystals. The crystals are separated from the solution containing the non-crystallizable material by filtration or the like. The crystals may then be washed to remove the entrained mother liquor, and dried, for example, with a current of warm air. The crystals are sufficiently pure for most uses, but if a purer product is desired, this may be obtained by re-crystallization from an aqueous solution.

The function of the urea in the process is not understood. It is known that in the usual solution of logwood extracts, the presence of the non-crystallizable materials inhibits the crystallization of the crystallizable material. The urea, in some manner not known, apparently acts on the non-crystallizable material, so that it no longer can prevent the crystallization of the crystallizable material.

Since one of the factors determining the yield of the hematoxylin obtained is the concentration of the solution of the urea, the use of a relatively concentrated solution is preferred, for example, 25% to saturation, which is about a 50% solution at room temperature. Generally, the use of a solution of a concentration in the neighborhood of 38% will be found to be advantageous. Solutions of a concentration lower than 25% may be used, but in any case the solution has a sufficient concentration so that hematoxylin in crystalline form is obtained.

Another factor involved in the process is the amount of logwood extract treated with the urea solution, and this amount may vary over a relatively wide range. In general, it has been found that the best results are obtained when the amount of logwood extract treated with the urea solution is sufficient to produce a solution of the extract in the solution approaching saturation. The amount will depend, to some extent, on the concentration of the urea solution and the type of extract treated. The process is, however, operative in the treatment of smaller amounts of logwood extract. Usually from 10 to 25% of the logwood extract, based on the weight of the solution, is treated with the urea solution, the use of about 20% of logwood extract giving very satisfactory results.

The length of time and the temperature at which the mixture of logwood extract and the solution of the urea is allowed to stand also affect the yield, and may be somewhat dependent one on the other. Satisfactory results are obtained by allowing the mixture to stand at room temperature for several hours, for example, from 2 to 24 hours. No advantage has been found to be gained by raising the solution above room temperature, but this may be done if desired. The time may be shortened to some extent if the mixture is cooled to a lower temperature.

In any particular case, in following the preferred embodiment, the factors of concentration of the urea solution, the amount of logwood extract treated therewith, and the time for and temperature at which the mixture of extract in solution is allowed to stand will be selected to obtain the desired yield of hematoxylin crystals. It is to be understood, however, that if desired, although no advantage is to be gained, a relatively small amount of logwood extract may be dissolved in a relatively dilute solution of urea, and by variation of time and temperature, a proper and balanced relationship of such factors may serve to produce an adequate yield of crystals.

In a typical case, 400 parts of dried aqueous logwood extract of the type available on the market under the term "Logwood Crystals AAA" are dissolved in 2000 parts of an aqueous solution of urea of approximately 38% concentration. The solution is allowed to stand at room temperature (70° F.) for 24 hours, during which time the hematoxylin crystals are formed. The hematoxylin crystals are removed from the solution containing non-crystallizable material, and are washed with water to remove the entrained mother liquor. They then are dried by a current of warm air. A yield of 77 parts of hematoxylin crystals of a relatively high degree of purity is obtained.

Considerable modification is possible not only in the selection of the factors hereinabove discussed, but also in the steps of the process without departing from the essential features of the invention.

I claim:

1. The process of separating hematoxylin from logwood extract which comprises dissolving said extract in an aqueous solution of urea, crystallizing hematoxylin in said solution, and separating the crystals of hematoxylin from the solution.

2. The process of separating hematoxylin from logwood extract which comprises dissolving said extract in an aqueous solution of urea of a concentration in which a substantial amount of said hematoxylin will crystallize from the solution, allowing the solution to stand to form hematoxylin crystals, and separating the crystals of hematoxylin from the solution.

3. The process of separating hematoxylin from logwood extract which comprises dissolving said extract in an aqueous solution of urea of a concentration in which a substantial amount of said hematoxylin will crystallize, the amount of logwood extract dissolved being sufficient to produce a solution approaching saturation, allowing the solution to stand to form hematoxylin crystals, and separating the crystals of hematoxylin from the solution.

ROY W. SHUNKWILER.